United States Patent
Chae

(10) Patent No.: US 10,166,962 B2
(45) Date of Patent: Jan. 1, 2019

(54) NOISE REDUCTION DEVICE FOR NEGATIVE PRESSURE LINE OF BRAKE BOOSTER

(71) Applicants: Hyundai Motor Company, Seoul (KR); Kia Motors Corporation, Seoul (KR)

(72) Inventor: Min Yeong Chae, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 132 days.

(21) Appl. No.: 15/204,910

(22) Filed: Jul. 7, 2016

(65) Prior Publication Data

US 2017/0113671 A1   Apr. 27, 2017

(30) Foreign Application Priority Data

Oct. 26, 2015 (KR) .................. 10-2015-0148462

(51) Int. Cl.
  *F16K 15/02* (2006.01)
  *B60T 17/00* (2006.01)
  *F16K 15/06* (2006.01)
  *B60T 13/52* (2006.01)

(52) U.S. Cl.
  CPC .......... *B60T 17/008* (2013.01); *F16K 15/025* (2013.01); *F16K 15/026* (2013.01); *F16K 15/063* (2013.01); *B60T 13/52* (2013.01)

(58) Field of Classification Search
  CPC .... F16K 15/025; F16K 15/026; F16K 15/063; B60T 17/008; B60T 13/52
  See application file for complete search history.

(56) References Cited

U.S. PATENT DOCUMENTS

| | | | | |
|---|---|---|---|---|
| 4,492,249 A | * | 1/1985 | Arino | ............ B60T 13/52 137/454.2 |
| 5,117,860 A | * | 6/1992 | Horner, Jr. | ............ B60T 13/241 137/512.1 |
| 2005/0023887 A1 | * | 2/2005 | Fulks | ............ B60T 13/48 303/4 |
| 2008/0007113 A1 | | 1/2008 | Choi | |

FOREIGN PATENT DOCUMENTS

| | | |
|---|---|---|
| CN | 102853131 A | 1/2013 |
| EP | 1598588 A1 | 11/2005 |
| JP | H116574 A | 1/1999 |
| JP | 2010-116979 A | 5/2010 |
| JP | 2011-153684 A | 8/2011 |
| JP | 2012-047291 A | 3/2012 |
| KR | 20-1988-0006515 | 5/1988 |

(Continued)

*Primary Examiner* — P. Macade Nichols
(74) *Attorney, Agent, or Firm* — Mintz Levin Cohn Ferris Glovsky and Popeo, P.C.; Peter F. Corless

(57) ABSTRACT

A noise reduction device for a negative pressure line of a brake booster is provided. The improved noise reduction device is disposed in a vacuum hose, and includes a negative pressure line of a vehicle in which a brake booster and a surge tank of an engine are connected via the vacuum hose to use negative pressure of the surge tank. In particular, noise caused by pulsation of an air flow and vibration of a valve which occur due to an operation of an engine piston is reduced.

15 Claims, 15 Drawing Sheets

(56) References Cited

FOREIGN PATENT DOCUMENTS

| | | | |
|---|---|---|---|
| KR | 10-0579735 | B1 | 5/2006 |
| KR | 10-0767486 | B1 | 10/2007 |
| KR | 10-0941808 | B1 | 2/2010 |
| KR | 10-1037019 | B1 | 5/2011 |
| KR | 10-1266116 | B1 | 5/2013 |

\* cited by examiner

[ A - A CROSS SECTION ]

NOISE REDUCTION DEVICE FOR NEGATIVE PRESSURE LINE OF BRAKE BOOSTER

CROSS-REFERENCE TO RELATED APPLICATION

This application claims under 35 U.S.C. § 119(a) the benefit of Korean Patent Application No. 10-2015-0148462 filed on Oct. 26, 2015, the entire contents of which are incorporated herein by reference.

BACKGROUND

(a) Technical Field

The present disclosure relates to a noise reduction device for a negative pressure line of a brake booster, and more particularly, to a noise reduction device which is disposed in a vacuum hose. In particular, a negative pressure line of a vehicle in which a brake booster and a surge tank of an engine are connected via the vacuum hose to use negative pressure of the surge tank, and reduce noise caused by pulsation of an air flow and vibration of a valve caused by an operation of an engine piston.

(b) Background Art

Generally, as vehicle size increases and a speed of the vehicle increases, a brake booster is used secure the brake function of the vehicle with minimal force exerted on a brake pedal. The brake booster is classified into a vacuum type brake booster which uses a pressure differential between vacuum and atmospheric pressure, and a compressed air type brake booster which uses the pressure of compressed air. The vacuum type brake booster applies a substantial amount of force to a brake exertion of differential pressure between atmospheric pressure and negative pressure generated in a surge tank of an engine or a vacuum pump to be exerted on a power piston disposed in the booster. For example, when the vacuum pump is used, the necessity of a separate device causes an increase in costs of the vehicle. Accordingly, the method of using negative pressure generated in the surge tank of the engine is typically used.

However, when negative pressure generated in the surge tank of the engine is used, the negative pressure is not always constantly generated. In particular, the negative pressure changes based on an ambient environment such as a mountainous area where air density is low, and as a result, the availability of the negative pressure required for the booster cannot be always ensured. To solve the problem, a negative pressure intensifier is disposed and used to increase vacuum at a brake booster side. The negative pressure intensifier increases the vacuum at the brake booster side by a pressure drop that occurs when a flow velocity of air increases while air, which flows in from an air cleaner by negative pressure of the surge tank, passes through a venturi tube disposed in the negative pressure intensifier. Accordingly, the negative pressure intensifier stably ensures the negative pressure required for the booster.

FIG. 1 is an exemplary view illustrating a surge tank 13 of an engine 10, a brake booster 20, and a negative pressure line (vacuum hose) 14 which connects the surge tank 13 and the brake booster 20. A check valve 15 is disposed in the negative pressure line 14 that connects the surge tank 13 of the engine 10 and the brake booster 20. In the configuration (e.g., without a negative pressure intensifier) as illustrated in FIG. 1, pulsation of an air flow and vibration of the check valve 15 occur in the negative pressure line 14 by operation of an engine piston. Further, noise occurs due to resonance caused by the pulsation and vibration. During charging of negative pressure of the brake booster 20, pulsation of an air flow caused by an operation of the engine piston, that is, noise such as air flow noise occurs due to the air vibration in the negative pressure line 14 and vibration of the check valve 15 resonate.

FIG. 2 is an exemplary view illustrating a configuration in which the negative pressure intensifier is additionally disposed, and negative pressure lines 16a, 16b, and 16c are connected between an intake port (e.g., air intake hose) 11 of the engine 10, the negative pressure intensifier 21, the surge tank 13 of the engine 10, and the brake booster 20. In particular, the negative pressure line 16a, which branches off from the intake port 11 of the engine 10 and bypasses a throttle valve 12, is connected to a venturi tube (not illustrated) of the negative pressure intensifier 21. The venturi tube is connected to the surge tank 13 of the engine 10 via the negative pressure line 16b. The negative pressure line 16c extends from a vacuum port of the brake booster 20 and is connected to the negative pressure intensifier 21. The negative pressure line 16c is connected to a neck portion of the venturi tube via a check valve (not illustrated) in the negative pressure intensifier 21.

As described above, the check valve, is disposed between the negative pressure line 16c and the venturi tube, is a check valve embedded in the negative pressure intensifier 21. Further, the check valve allows air to flow to the venturi tube from the vacuum port of the brake booster 20. The negative pressure line 16c, is connected to the vacuum port of the brake booster 20 from the venturi tube via the check valve, and is a negative pressure intensifying line that intensifies negative pressure. A separate externally-carried check valve 17 is further disposed in the negative pressure line 16c in which negative pressure is intensified.

As illustrated in FIG. 2, (e.g., when the negative pressure intensifier is applied) pulsation of an air flow and vibration of the check valve in the negative pressure intensifier occur in the negative pressure line by an operation of an engine piston. Further, noise occurs due to resonance caused by the pulsation and vibration. In other words, when negative pressure of the brake booster is charged, pulsation of an air flow caused by an operation of the engine piston occurs. Namely, air flow noise occurs due to air vibration in the vacuum hose and vibration of the check valve in the negative pressure intensifier.

When the negative pressure intensifier 21 is applied, the externally-carried check valve 17 is installed at the middle of the negative pressure line 16c that connects the brake booster 20 and the negative pressure intensifier 21, thereby reducing noise. Since the check valve is embedded in the negative pressure intensifier 21, the externally-carried check valve 17 is disposed to reduce noise rather than to serve as a check valve for preventing a reverse flow of air. Accordingly, the externally-carried check valve 17 attenuates air vibration that causes noise in the negative pressure line based on properties of an air flow path in the valve.

FIGS. 3A and 3B are an exemplary view illustrating the externally-carried check valve in the related art, and, the externally-carried check valve 17 is disposed in flow tubes 17a at both sides of the valve into two negative pressure lines 16c. In other words, the externally-carried check valve is disposed within the respective vacuum hoses at both sides which are separated from each other. The externally-carried check valve 17 is connected thereto by fixing clips 18. The externally-carried check valve 17 may be difficult to be applied based on a layout condition at the periphery of the vacuum hose. For example, an overall length including the flow tubes 17a reaches about 6 to 7 cm, and a size of the externally-carried check valve 17 is greater. The vacuum hose 16c is separated into two vacuum hoses 16c, and additional fixing clips 18 are used. Accordingly, an increase in costs occurs, and a negative pressure charging speed is reduced since a typical check valve prevents a reverse flow when the externally-carried check valve 17 is used for reducing noise.

The above information disclosed in this section is merely for enhancement of understanding of the background of the invention and therefore it may contain information that does not form the prior art that is already known in this country to a person of ordinary skill in the art.

SUMMARY

The present invention provides an improved noise reduction device which is disposed in a vacuum hose. Namely, a negative pressure line of a vehicle connects a brake booster and a surge tank of an engine via the vacuum hose to use negative pressure of the surge tank, and reduces noise caused by pulsation of an air flow and vibration of a valve which occur due to an operation of an engine piston. In particular, a noise reduction device which has a reduced geometry (e.g., size) may be more easily disposed within a vacuum hose and may improve a negative pressure charging speed.

In one aspect, the present invention provides a noise reduction device for a negative pressure line of a brake booster, that may include a housing which has a main flow path through which air passes, a closing unit positioned in the main flow path, a main flow path inlet connected to a brake booster side via a first side vacuum hose, and a main flow path outlet connected to an engine side via a second side vacuum hose. A choke valve may include a flow tube coupled to the closing unit and has a choke valve aperture penetratively formed at a first side of the flow tube to allow an interior flow path of the flow tube to communicate with the main flow path. A first valve body may be integrally formed with the flow tube and may have a choke flow path inlet formed to allow the interior flow path of the flow tube to communicate with an interior of the a first side vacuum hose. A main spring may elastically support the choke valve and the choke valve may be configured to be elastically movable forward and rearward within the housing. In particular, the choke valve may be configured to move forward and rearward based on pressure at the brake booster side exerted on a front side of the first valve body through the main flow path inlet and pressure at the engine side exerted on a rear surface of the first valve body through the main flow path outlet and the main flow path. The first valve body may be configured to open and close the main flow path inlet based on a position of the choke valve in front and rear directions, and the choke valve aperture may be configured to be opened and closed by the closing unit.

In an exemplary embodiment, the noise reduction device may be inserted and disposed within the vacuum hose that connects the brake booster side and a surge tank of the engine. In addition, the noise reduction device may be fixed by press-fitting the housing into the vacuum hose that connects the brake booster side and the surge tank of the engine.

Further, a valve seating portion may be formed to protrude inward along the circumference of the main flow path inlet of the housing. For example, the main flow path inlet may be closed when the front surface of the first valve body of the choke valve is seated on the valve seating portion. The closing unit may be disposed to be fixed and supported within the housing by supports. The closing unit may be formed in a cylindrical shape with the flow tube of the choke valve inserted into the closing unit and may be configured to be slidable forward and rearward. The choke valve aperture of the flow tube may be configured to be closed by being positioned inside the closing unit or may be configured to be opened by being exposed to the exterior of the closing unit, based on the positions of the choke valve and the flow tube in the front and rear directions.

In some exemplary embodiments, the supports may extend to connect an interior surface of the housing and an exterior surface of the closing unit, for example, the spaces between the supports in the housing may become the main flow path outlet. In addition, the housing may include, a cylindrical main housing having a first end portion open to form the main flow path inlet and a ring-shaped sub-housing coupled to a second end portion of the main housing and in which the supports and the closing unit are disposed.

In another exemplary embodiment, the choke valve may include the flow tube having a tubular shape and in which the choke valve aperture may be penetratively formed. The first valve body may have a plate shape and may be integrally formed with a first end portion of the flow tube. When a negative pressure intensifier is disposed in the vacuum hose between the brake booster and the engine, the noise reduction device may be inserted and disposed into the vacuum hose between the negative pressure intensifier and the brake booster.

In another exemplary embodiment, a negative pressure intensifier may be disposed in the vacuum hose between the brake booster and the engine. The first side of the vacuum hose may be connected with the brake booster, and a second side of the vacuum hose may be connected to the engine via the negative pressure intensifier. When the negative pressure intensifier may be included, and a check valve assembly, may be configured to open and close the choke valve aperture based on pressure at the brake booster side exerted in the interior flow path of the flow tube, may be disposed in the flow tube of the choke valve.

In an exemplary embodiment, the check valve assembly may include a fixing unit coupled (e.g., integrally and fixedly) to the flow tube of the choke valve, a second valve body that may be configured to selectively open and close the choke valve aperture while being configured to move (e.g., translate) forward and rearward in the flow tube of the choke valve based on pressure at the brake booster side. Further, a valve spring may be installed to connect the fixing unit and the second valve body and elastically support the second valve body with respect to the fixing unit.

In another exemplary embodiment, a valve seat surface, having a catching projection structure, may be disposed within the flow tube, for example, when the second valve body moves forward and closes the choke valve aperture, the second valve body may be seated on the valve seat surface at a fixed position (e.g., to preclude further forward movement). In addition, the valve seat surface may be formed to allow an interior diameter of the flow tube at a portion where the first valve body may be formed based on the choke valve aperture to be less than an interior diameter at the check valve assembly insertion position.

According to the noise reduction device of the present invention, the main flow path, the interior flow path of the flow tube, and a choke flow path including the choke valve aperture may be configured to be selectively opened and closed based on pressure at a booster side and an engine side. In particular, an operation that prevents a decrease in negative pressure charging speed may be selectively performed by utilization of the main flow path based on booster pressure in addition to an operation of reducing noise reduction by utilization of the choke flow path, thereby solving a problem in the related art caused by a decrease in negative pressure charging speed.

The noise reduction device may have a reduced size, and may be installed by being simply inserted into the vacuum hose, and as a result, the noise reduction device may be more easily installed. Furthermore, it is not necessary to separate the negative pressure line (vacuum hose) at an installation position like the related art, and components such as a fixing clip may be omitted. As a result, it may be possible to reduce costs, and solve a problem regarding a restriction on installation caused by a layout condition at the periphery of the vacuum hose.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
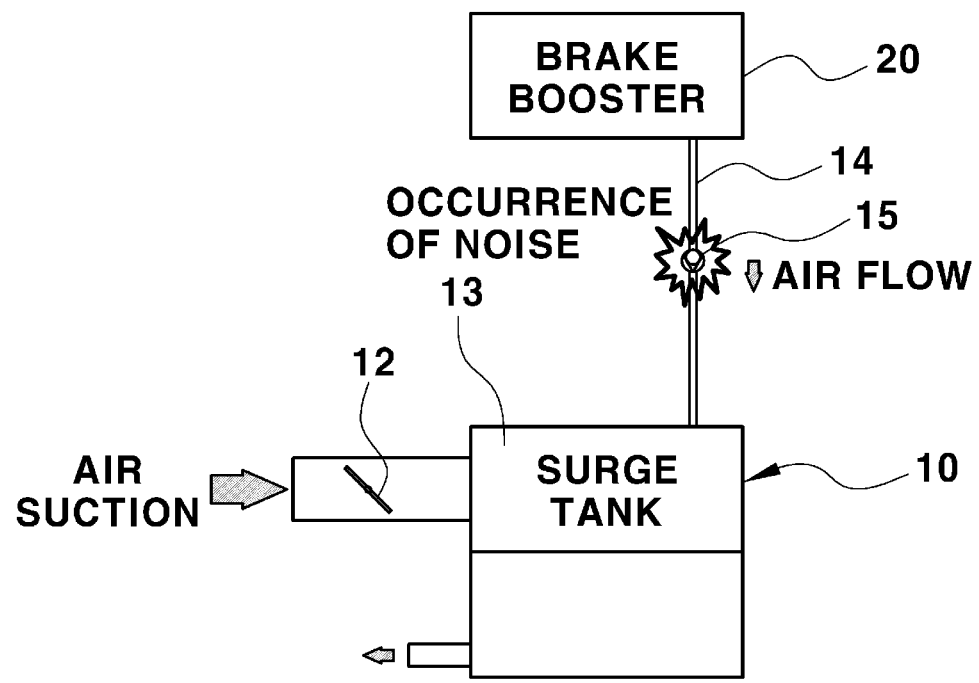
FIG. 1 is an exemplary view illustrating a surge tank of an engine, a brake booster, and a negative pressure line which connects the surge tank and the brake booster in the related art.
Figure 2:
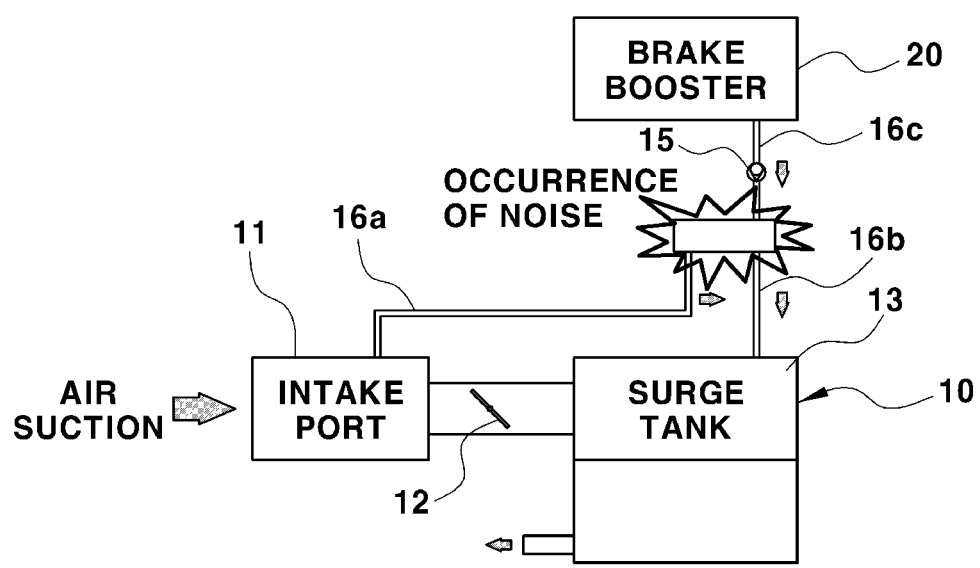
FIG. 2 is an exemplary view illustrating a configuration in which a negative pressure intensifier is additionally installed in the related art.
Figure 3A:
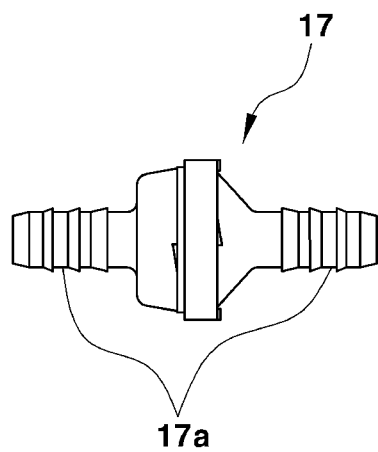
FIGS. 3A and 3B are exemplary views illustrating an externally-carried check valve in the related art.
Figure 3B:
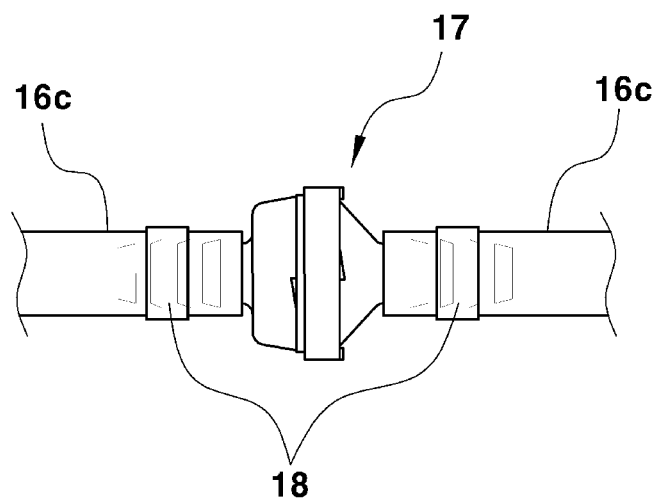

Reference numerals set forth in the Drawings include reference to the following elements as further discussed below:

- 10: engine
- 11: intake port
- 12: throttle valve
- 13: surge tank
- 14: negative pressure line (vacuum hose)
- 15: check valve
- 16a, 16b, 16c: negative pressure line (vacuum hose)
- 17: externally-carried check valve
- 17a: flow tube
- 18: fixing clip
- 20: brake booster
- 21: negative pressure intensifier
- 100: noise reduction device
- 110: housing
- 110a: main flow path
- 111: main housing
- 112: main flow path inlet
- 113: valve seating portion
- 114: sub-housing
- 115: closing unit
- 116: support
- 117: space
- 120: choke valve
- 121: flow tube
- 122: first valve body
- 123: choke valve aperture
- 124: valve seat surface
- 125: choke flow path inlet
- 130: main spring
- 140: check valve assembly
- 141: fixing unit
- 142: second valve body
- 143: valve spring It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Hereinafter reference will now be made in detail to various exemplary embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings so that those skilled in the art to which the present invention pertains may easily carry out the exemplary embodiments.

A noise reduction device, that includes a choke flow path (e.g., a long orifice), is disclosed, and the noise reduction device may be disposed within a vacuum hose, to attenuate a pulsation of an air flow and vibration by air, caused by an operation of an engine piston.

However, when a flow rate of air through the noise reduction device decreases by the choke flow path a negative pressure charging speed of a brake booster may be reduced. Therefore, the noise reduction device may exhibit a reduction noise that allows air to flow through the choke flow path (e.g., a flow path including a choke valve aperture to be described below) when negative pressure is charged when booster negative pressure is sufficient. However, the noise reduction device may prevent a negative pressure charging speed from being decreased by allowing air to flow through a main flow path at a relatively higher flow rate when the booster negative pressure is insufficient at or below a certain level.

When the booster negative pressure is insufficient at or below a certain level, it is important to ensure negative pressure for braking force rather than to reduce noise. Accordingly, the main flow path may be configured to be opened to minimize a loss of an air flow rate. Further, when the booster negative pressure is at a higher level, for example, during normal operation the level of negative pressure may be satisfied and marketability associated with noise reduction. The choke flow path may be configured to be opened, and the main flow path may be configured to be closed, thereby maximizing effects of attenuating vibration and reduction noise.

In particular, the noise reduction device according to the present invention may be configured to open and close the choke flow path based on booster pressure. For example, the choke flow path may be configured to open and close when the main flow path is closed, to allow air to flow through the choke flow path to charge negative pressure. Further, the choke flow path may be configured to be opened and closed when the main flow path is opened, to allow air to flow only through the main flow path to charge the negative pressure.

Figure 4:
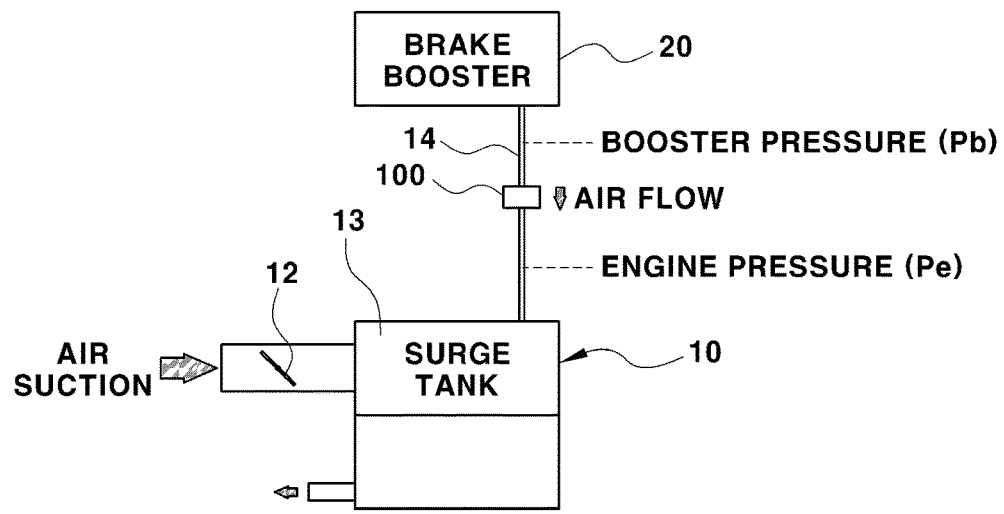
FIG. 4 is an exemplary view illustrating a state in which a noise reduction device according to a first exemplary embodiment of the present invention is installed.
Figure 5:
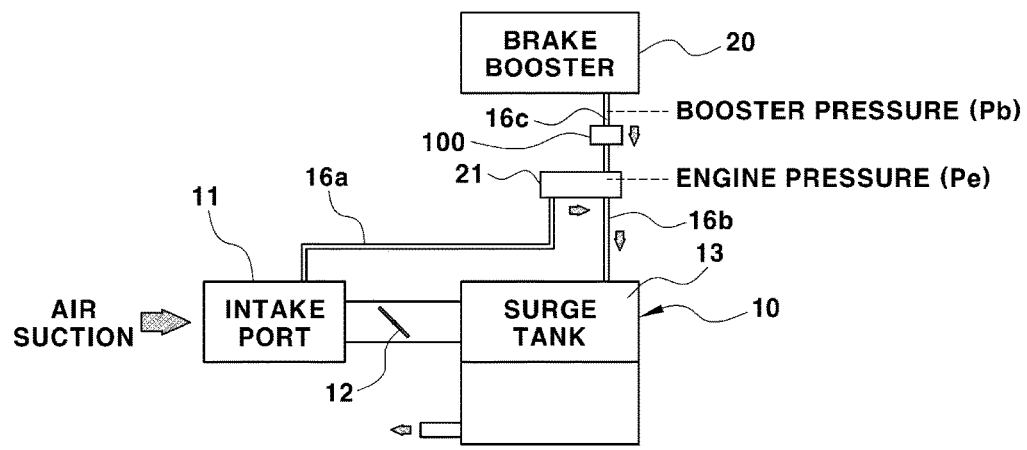
FIG. 5 is an exemplary view illustrating a state in which a noise reduction device according to a second exemplary embodiment of the present invention is installed.

FIGS. 4 and 5 are exemplary views illustrating states when the noise reduction device according to the exemplary embodiments of the present invention is installed. As illustrated in FIG. 4, in a vehicle that has no negative pressure intensifier, a noise reduction device 100, instead of a check valve in the related art, may be disposed in a vacuum hose (negative pressure line) 16c that connects a surge tank 13 of an engine 10 and a brake booster 20. The noise reduction device 100 according to the exemplary embodiment (e.g., a first exemplary embodiment), which further includes a check valve assembly to be described below, may be used when the negative pressure intensifier is not installed.

As illustrated in FIG. 5, in a vehicle which includes a negative pressure intensifier 21, the noise reduction device 100, instead of an externally-carried check valve in the related art, may be disposed in the vacuum hose 16c that connects the negative pressure intensifier 21 and the brake booster 20. The noise reduction device 100 according to the exemplary embodiment (e.g., a second exemplary embodiment), which does not include the check valve assembly, may be used when the negative pressure intensifier 21 is installed. In other words, when a negative pressure intensifier is not provided, the noise reduction device 100 may be configured to prevent a reverse flow in place of the existing check valve. Accordingly, the noise reduction device 100 may be used which includes a check valve assembly 140 that may obstruct an air flow in a reverse direction from the surge tank 13 of the engine 10 to the booster 20 under a particular pressure condition based on booster pressure Pb.

In contrast, when the negative pressure intensifier 21 is provided, the negative pressure intensifier may include a check valve therein. Accordingly, the noise reduction device 100, without a check valve assembly, may include two check valves, which are disadvantageous in terms of the air flow rate. The noise reduction device 100 according to the present invention may be manufactured to have a small size and to be disposed into the vacuum hose 16c. As a result, the noise reduction device 100 may be more easily and simply installed in the vacuum hose regardless of a layout condition at the periphery of the vacuum hose. It is not necessary to apply a vacuum hose 16c separated to both sides like in the related art, and it is not necessary to use a fixing clip or the like.

Hereinafter, in the present specification, the exemplary embodiment, which further includes the check valve assembly, is referred to as the first exemplary embodiment, and the exemplary embodiment, which does not include the check valve assembly, is referred to as the second exemplary embodiment.

Figure 6:
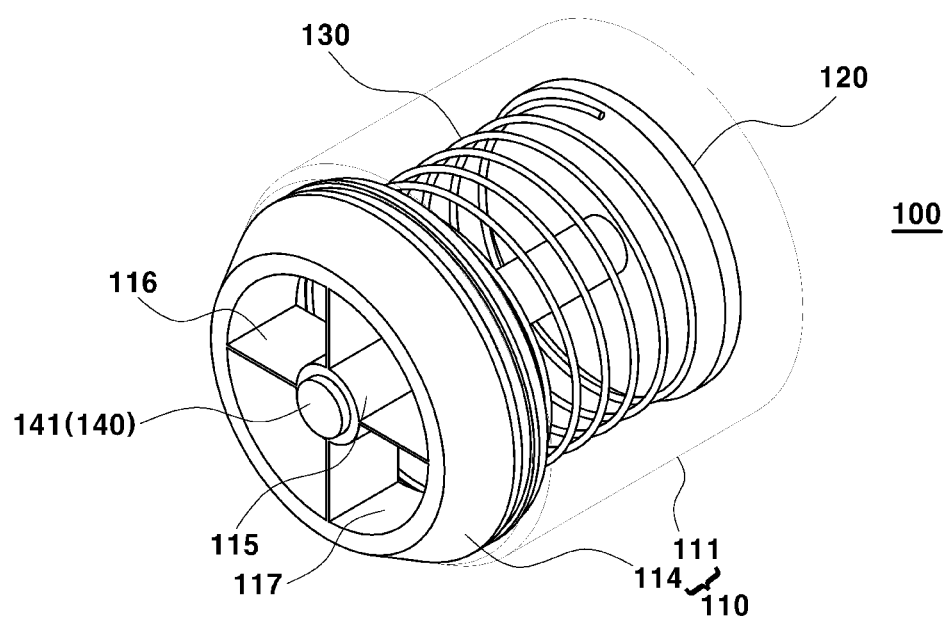
FIG. 6 is an exemplary perspective view illustrating a state in which the noise reduction device according to the first exemplary embodiment of the present invention is assembled.
Figure 7:
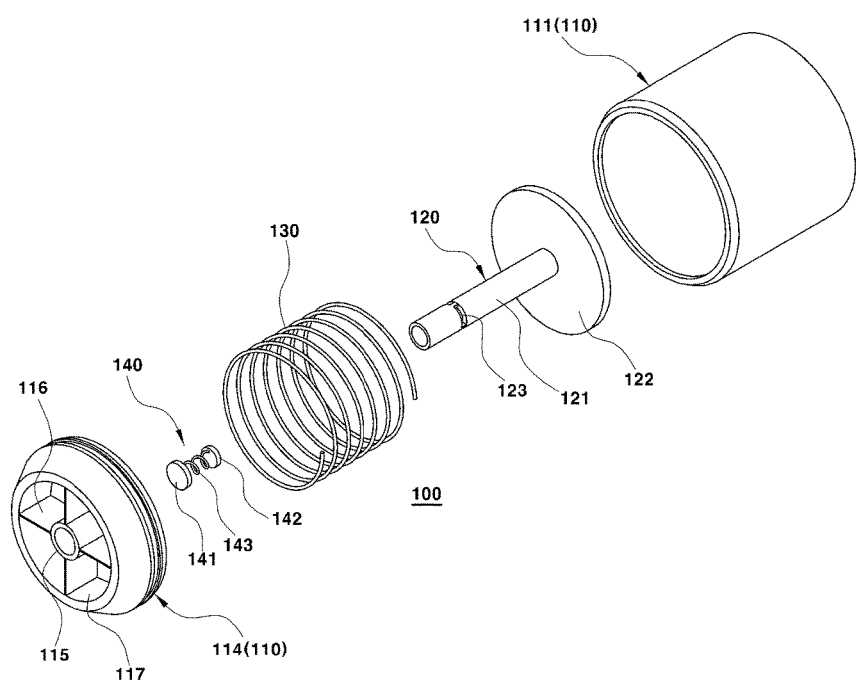
FIG. 7 is an exemplary perspective view illustrating a state in which the noise reduction device according to the first exemplary embodiment of the present invention is disassembled.
Figure 8:
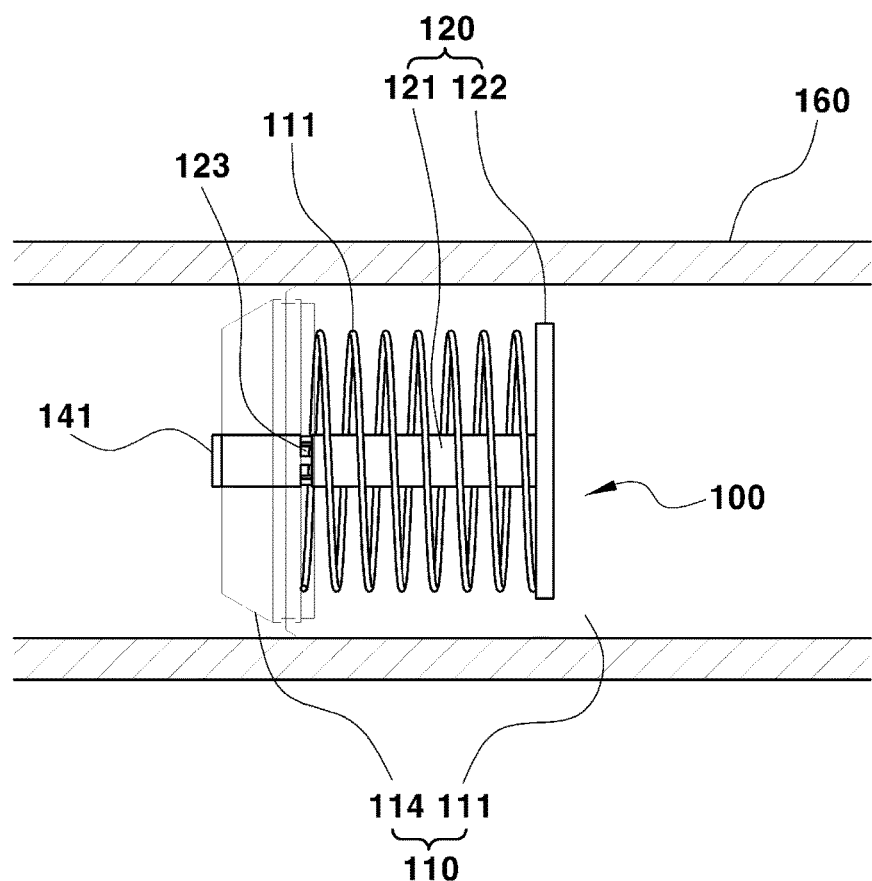
FIG. 8 is an exemplary cross-sectional view illustrating a state in which the noise reduction device according to the first exemplary embodiment of the present invention is installed in a vacuum hose.
Figure 9A:
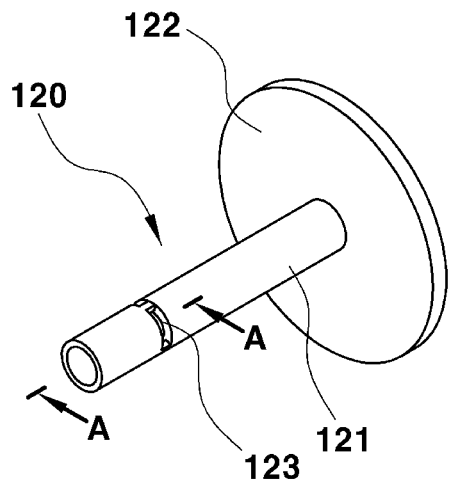
FIGS. 9A and 9B are exemplary views illustrating a choke valve of the noise reduction device according to the first exemplary embodiment of the present invention.
Figure 9B:
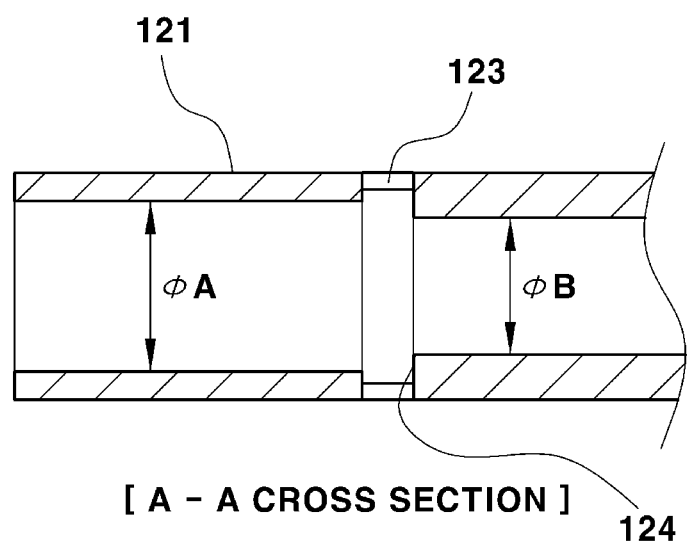
Figure 10:
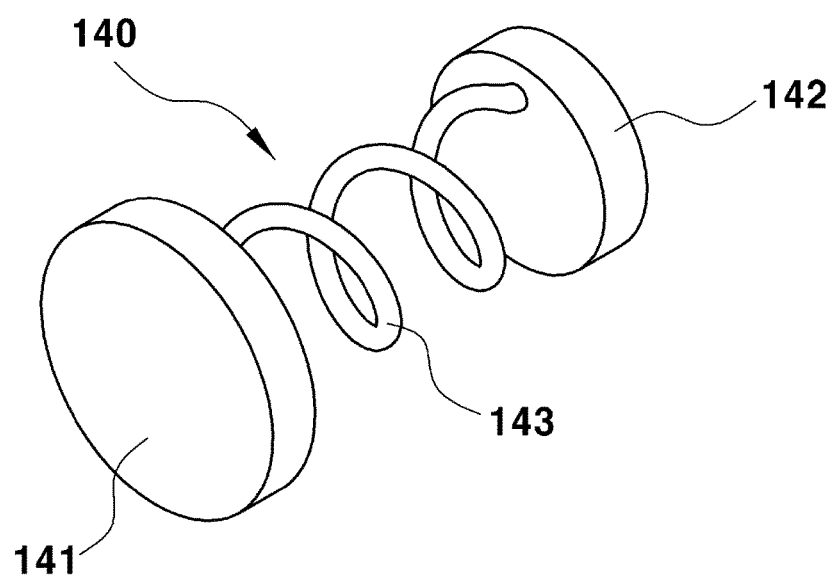
FIG. 10 is an exemplary cross-sectional view illustrating a state in which a choke valve aperture of the noise reduction device according to the first exemplary embodiment of the present invention is closed by a check valve assembly.
Figure 11:
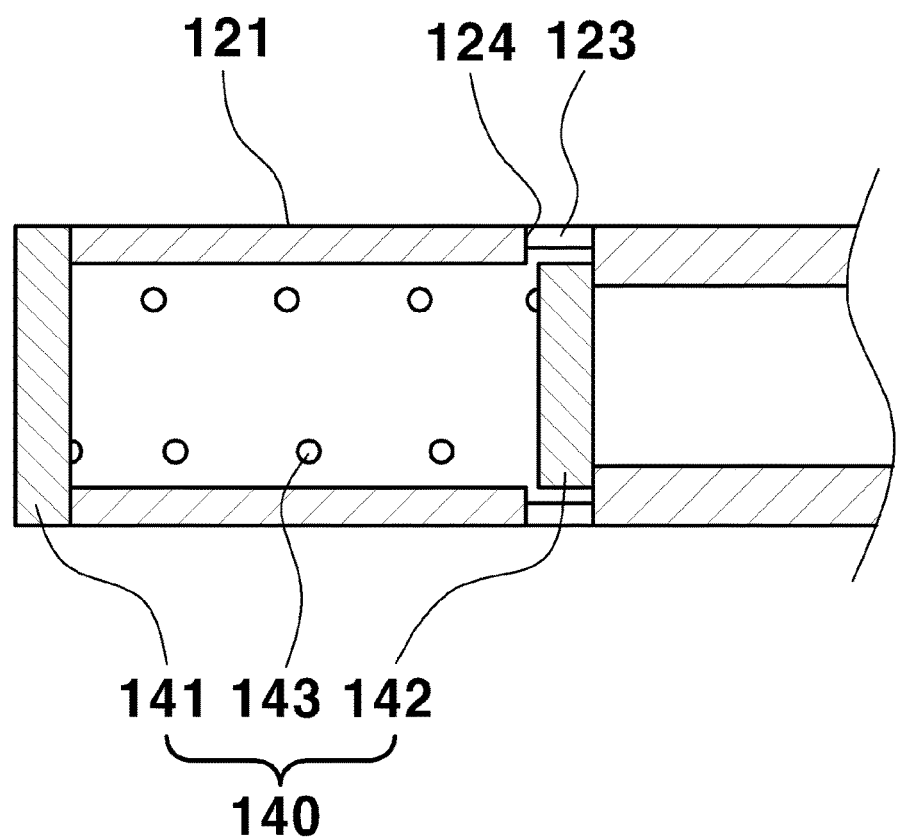
FIG. 11 is an exemplary cross-sectional view illustrating a state in which the check valve assembly of the noise reduction device according to the first exemplary embodiment of the present invention is assembled.

FIG. 6 is an exemplary perspective view illustrating a state in which the noise reduction device according to the first exemplary embodiment of the present invention is assembled, and FIG. 7 is an exemplary perspective view illustrating a state in which the noise reduction device according to the first exemplary embodiment of the present invention is disassembled. FIG. 8 is an exemplary cross-sectional view illustrating a state in which the noise reduction device according to the first exemplary embodiment of the present invention is disposed in the vacuum hose. FIGS. 9A and 9B are an exemplary view illustrating a choke valve. FIG. 10 is an exemplary cross-sectional view illustrating a state in which a choke valve aperture is closed by the check valve assembly according to the first exemplary embodiment. FIG. 11 is an exemplary cross-sectional view illustrating a state in which the check valve assembly of the noise reduction device according to the first exemplary embodiment of the present invention is assembled.

As illustrated, the noise reduction device 100 according to the first exemplary embodiment of the present invention may include a housing 110, a choke valve 120, a check valve assembly 140, and a main spring 130. In particular, the housing 110 may include an internal space which accommodates the choke valve 120, the check valve assembly 140, and the main spring 130, and may be used as a main flow path 110a. The housing 110 may include two parts, a main housing 111 and a sub-housing 114 which may be separately provided and coupled to each other to accommodate components in the internal space. The main housing 111 of the housing 110 may be positioned upstream at a front side, and the sub-housing 114 of the housing 110 may be positioned downstream at a rear side, based on a flow direction of air that flows in the vacuum hose 16c from the brake booster 20 to the surge tank 13 of the engine 10 during charging negative pressure.

Hereinafter, in the present specification, front and rear directions are defined based on a flow direction of air that passes through the noise reduction device 100. The main housing 111 may have a cylindrical shape, and the main housing 111 may be press-fitted into the vacuum hose 16c. For example, the position of the entire noise reduction device 100 may be fixed in the vacuum hose 16c. A first end portion may include, a front end portion of the main housing 111 opened to form a main flow path inlet 112, and the main flow path inlet 112 may be connected to the brake booster 20 through the vacuum hose 16c.

A valve seating portion 113, may protrude inward along the entire circumference of the main flow path inlet 112, and may be formed at the front end portion of the main housing 111. The valve seating portion 113 may provide a surface to seat a front surface of a first valve body 122 of the choke valve 120. When the front surface of the first valve body 122 of the choke valve 120 is seated on the valve seating portion 113, the main flow path inlet 112 of the housing 110 may be configured to be closed by the first valve body 122.

The sub-housing 114 may be coupled by being press-fitted into a second end portion of a rear end portion of the main housing 111, and may have an overall ring shape. A cylindrical closing unit 115, into which an end portion of a flow tube 121 of the choke valve 120, which will be described below, may be inserted and coupled, and may be disposed at a central portion of the ring-shaped sub-housing 114. The closing unit 115 may be positioned in the main flow path 110a and may be fixed and supported by supports 116 that connect an interior surface of the sub-housing 114 and an exterior surface of the closing unit. The supports 116 may be formed to be elongated in a radial direction to connect the interior surface of the sub-housing 114 and the exterior surface of the closing unit 115. Further, the supports 116 may be formed to be radially disposed around the closing unit 115.

Additionally, spaces 117 between the supports 116 in the sub-housing 114 may serve as an air outlet of the noise reduction device 100 and an air outlet of the main flow path 110a, and may be connected to the surge tank 13 of the engine 10 via the vacuum hose 16c. In the second exemplary embodiment to be described below, the spaces 117 may be connected to the surge tank 13 of the engine 10 via the vacuum hose 16c, and the negative pressure intensifier 21.

In addition, the closing unit 115 may be configured to guide and support the flow tube 121 of the choke valve 120 and may be configured to slide forward and rearward when the choke valve 120 slides forward and rearward when the flow tube 121 of the choke valve 120, is inserted into the closing unit 115. Further, a choke valve aperture 123 formed in the flow tube 121 based on a position of the choke valve 120 in the front and rear directions may be configured to selectively close.

Particularly, the spaces 117, which are formed between the supports 116 in the sub-housing 114 and may be configured to be the air outlet of the noise reduction device 100 and the air outlet of the main flow path 110a, and may be opened at all times to allow the internal space of the main housing 111 to communicate with an internal space of the vacuum hose 16c which is an external space of the noise reduction device. An equivalent pressure may be exerted in the surge tank 13 of the engine 10, the vacuum hose 16c, and the internal space of the housing 110 to the first valve body 122 of the choke valve 120. In other words, pressure Pe of the surge tank of the engine 10, may be equal to pressure in the surge tank 13 and the vacuum hose 16c, may be exerted on a rear surface of the first valve body 122 of the choke valve 120 (e.g., the rear surface of the first valve body 122 may be a surface directed toward the engine, and a front surface of the first valve body may be a surface directed toward the booster).

Furthermore, the choke valve 120 may include the flow tube 121 with a choke flow path that has a long tubular shape and includes a tubular interior flow path, and the first valve body 122 may be integrally formed with a front end portion of the flow tube 121. The end portion of the flow tube 121 may be configured to be inserted into and slidably coupled to the closing unit 115 of the housing 110 as described above. The choke valve aperture 123, may be configured to be opened and closed by the closing unit 115 of the housing 110 based on a sliding position in the front and rear directions, and may be penetratively formed at a first side of the flow tube 121.

The choke valve aperture 123 may be an aperture that generates as an outlet of the choke flow path disposed in the interior flow path of the flow tube 121, and may be penetratively formed at a first side of the flow tube 121 to allow the flow tube 121 to communicate with the main flow path 110a. Therefore, the air, may be configured to flow along the choke flow path within the interior flow path of the flow tube 121, may pass through the choke valve aperture 123. Then the air may be drawn into the vacuum hose 16c and the engine 10 via the main flow path 110a through the outlet of the noise reduction device 100, in other words, within the spaces 117 formed between the supports 116 in the housing 110 (e.g., sub-housing).

The check valve assembly 140 may be configured to be inserted and disposed into the end portion of the flow tube 121. A fixing unit 141 of the check valve assembly 140 may be integrally fixed and coupled to an end surface of the rear end portion of the flow tube 121 to seal the interior flow path of the flow tube 121. In other words, a valve seat surface 124 may be provided in the flow tube 121 when a second valve body 142 of the check valve assembly 140, which may be configured to selectively open and close the choke valve aperture 123 of the flow tube 121 based on a movement position in the front and rear directions, translates (e.g., moves) forward in the flow tube 121 and may be configured to close the choke valve aperture 123, the second valve body 142 may be seated on and caught by the valve seat surface 124 to prevent a further forward motion.

The valve seat surface 124 may be configured to be a stopper that prevents the second valve body 142 from further moving forward at a position where the second valve body 142 closes the choke valve aperture 123. An interior diameter ΦB of the front end portion of the flow tube 121, may be disposed at a portion where the first valve body 122 is formed based on the choke valve aperture 123 and may be less than an interior diameter ΦA of the rear end portion of the flow tube 121 that may be disposed at a portion where the check valve assembly 140 is inserted. In other words, the interior diameter ΦA of the portion of the flow tube 121 where the check valve assembly 140 may be embedded may be greater, and the interior diameter ΦB of the remaining portion of the flow tube 121 after the choke valve aperture 123 may be relatively minimal to enable the second valve body 142 to be seated when the choke valve aperture 123 is in a closed position, thereby forming a seating surface by which the second valve body 142 may be caught.

The end surface of the front end portion of the flow tube 121, which has the reduced interior diameter, may operate as a catching projection by which the second valve body 142 may be entrapped to prevent further forward movement. The end surface of the front end portion of the flow tube 121 may become the valve seat surface 124 on which the second valve body 142 is seated and supported when the choke valve aperture 123 closes. The first valve body 122 of the choke valve 120 may be configured to open and close the main flow path inlet 112, which may be disposed at the front end portion of the main housing 111, based on the position of the choke valve 120 that may be configured to slide in the front and rear directions. A rear surface of the first valve body 122 may be configured to close the main flow path inlet 112 when the first valve body 122 is seated on the valve seating portion 113 of the main housing 111.

The first valve body 122 may have a circular plate shape and may be integrally formed with the front end portion that has a first end portion of the flow tube 121, and a choke flow path inlet 125, which allows the interior flow path of the flow tube 121 to communicate with the interior of the vacuum hose, and may be formed at a central portion of the first valve body 122. Pressure Pb of the brake booster 20 may be exerted on the front surface of the first valve body 122 through the main flow path inlet 112 of the housing 110 and the vacuum hose 16c, and pressure Pe of the engine 10 (pressure of the surge tank) may be exerted on the rear surface of the first valve body 122 through the vacuum hose 16c and the outlet of the housing 110.

Moreover, the main spring 130 may be disposed to elastically support the choke valve 120 at a rear side of the housing 110, and disposed between the housing 110, particularly, the sub-housing 114 and the rear surface of the first valve body 122 of the choke valve 120. A first end portion of the main spring 130 may be in contact with and coupled to the sub-housing 114. The second end portion of the main spring 130 may be in contact with and coupled to the rear surface of the first valve body 122 of the choke valve 120, and may thereby elastically support the choke valve 120 through the first valve body 122. In particular, the spring force of the main spring 130 may be determined to enable the first valve body 122 to be configured to smoothly open and close the main flow path inlet 112 of the housing 110 at a necessary point of time based on the booster pressure Pb and the pressure of the engine 10 which are exerted on the front and rear surfaces of the first valve body 122.

The check valve assembly 140 may include the fixing unit 141 which may be integrally and fixedly coupled to the end surface of the rear end portion of the flow tube s to seal the interior flow path of the flow tube 121, the second valve body 142 may be disposed in the flow tube 121 and may be configured to selectively open and close the choke valve aperture 123 while moving forward and rearward based on the booster pressure exerted through the flow tube 121. A valve spring 143 may be disposed to connect the fixing unit 141 and the second valve body 142 and may elastically support the second valve body 142 with respect to the fixing unit 141.

The noise reduction device 100 according to the first exemplary embodiment has been described above, and the noise reduction device 100 according to the second exemplary embodiment has the same configuration as the noise reduction device 100 according to the first exemplary embodiment except that the check valve assembly may be omitted in the second exemplary embodiment, and thus a description of the configuration according to the second exemplary embodiment will be omitted.

Hereinafter, an operational state of the noise reduction device will be described. In the noise reduction device 100 according to the present invention, the main flow path 110a, may be the interior flow path of the housing 110, the interior flow path of the flow tube 121, and the choke flow path including the choke valve aperture 123 may be configured to be selectively opened and closed based on pressure exerted on the first valve body 122 of the choke valve 120 and the second valve body 142 of the check valve assembly 140.

Figure 12A:
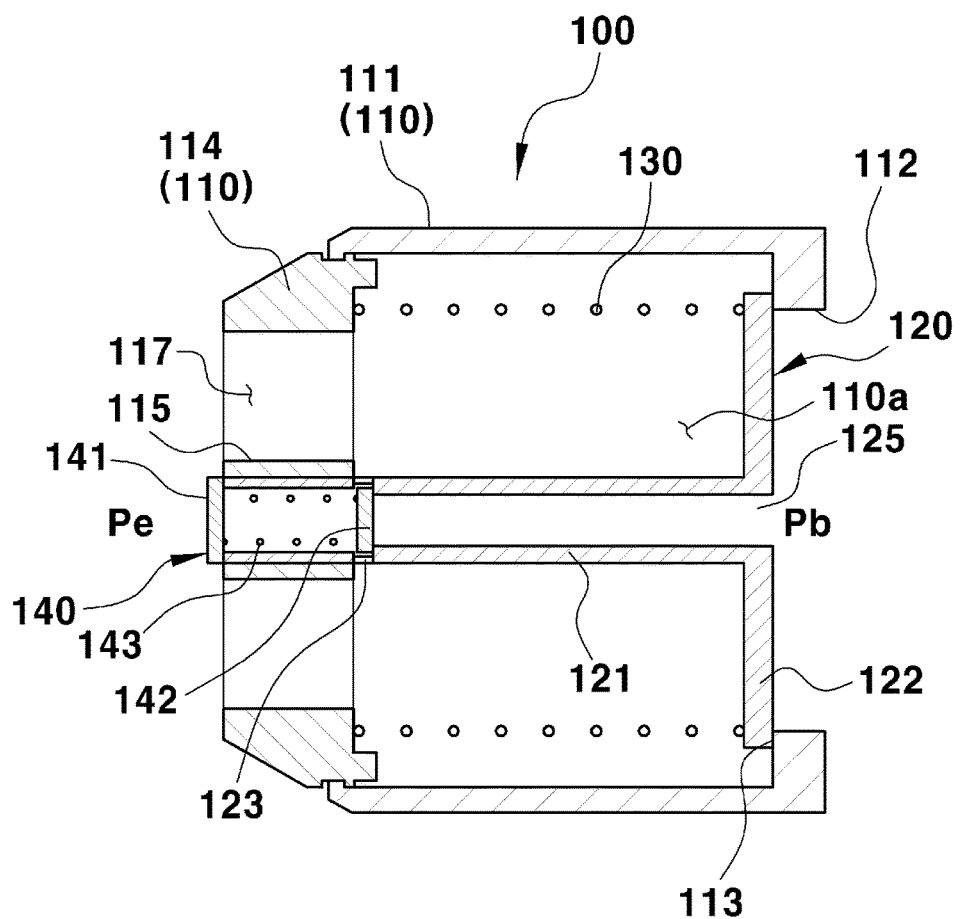
FIGS. 12A to 12C are an exemplary views illustrating a state in which the noise reduction device according to the first exemplary embodiment of the present invention is operated.
Figure 12B:
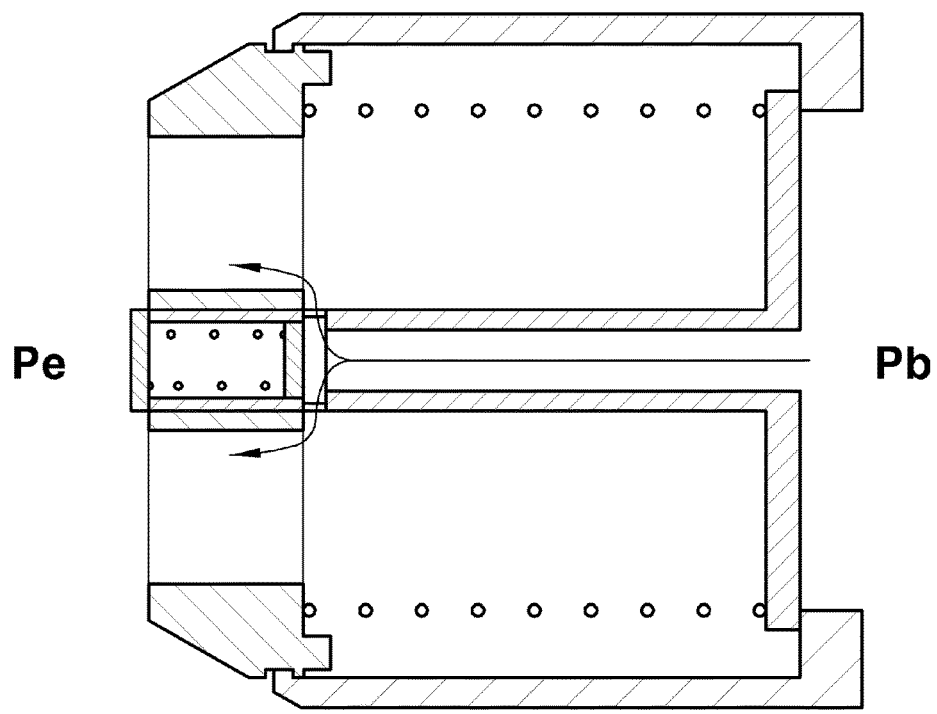
Figure 12C:
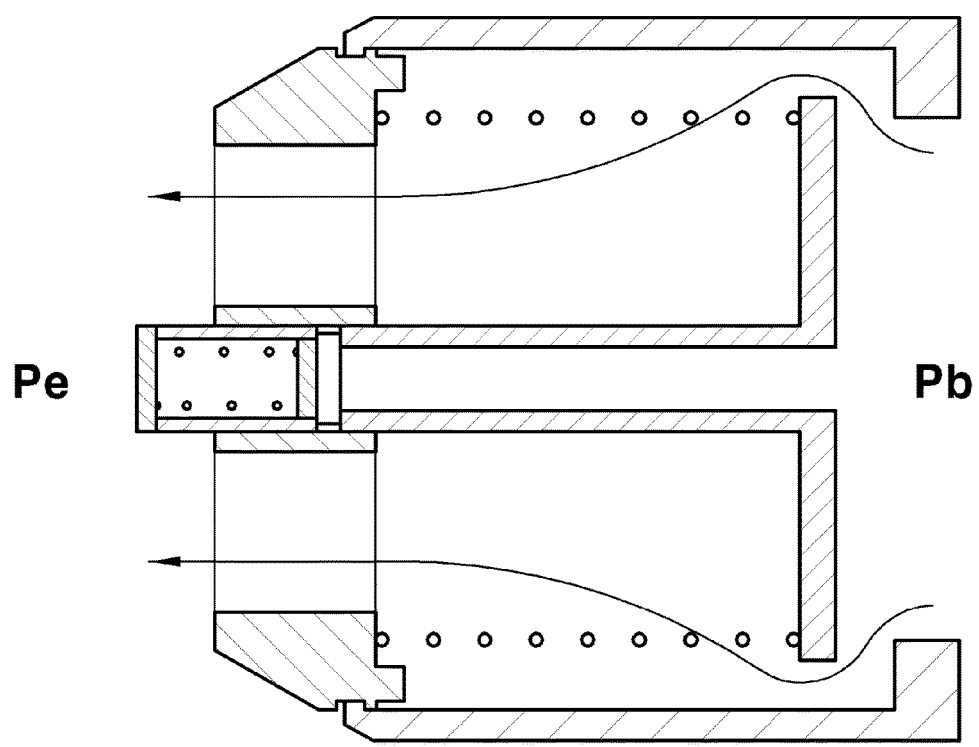

As shown, FIGS. 12A to 12C are exemplary views illustrating a state in which the noise reduction device 100 according to the first exemplary embodiment is operated, and as described above, when no negative pressure intensifier is applied, the noise reduction device 100 including the check valve assembly 140 may be installed in the vacuum hose (negative pressure line) 16c. FIG. 12A illustrates a state in which both of the main flow path 110a and the choke flow path are closed, FIG. 12B illustrates a state in which the choke flow path is opened, and FIG. 12C illustrates a state in which the main flow path 110a is opened.

Under a reverse negative pressure condition in which the booster pressure Pb is less than the pressure Pe of the surge tank 13 of the engine 10 (hereinafter, referred to as 'engine pressure'), both of the main flow path inlet 112 of the housing 110 and the choke valve aperture 123 of the choke valve 120 may be maintained closed by the choke valve 120 and the check valve assembly 140 as illustrated in FIG. 12A.

In other words, since the pressure Pb of booster may be exerted on the front surface of the first valve body 122 of the choke valve 120 may be less than the engine pressure Pe which may be exerted on the rear surface of the first valve body 122 of the choke valve 120. The first valve body 122 of the choke valve 120 may be configured to close the main flow path inlet 112 provided at the front end portion of the housing 110 when the choke valve 120 has moved forward.

The first valve body 122 of the choke valve 120 may be in contact with and seated on the valve seating portion 113 of the housing 110 by spring force of the main spring 130. The second valve body 142 of the check valve assembly 140, may be elastically supported by the valve spring 143, and may be configured to close the choke valve aperture 123 when caught by and seated on the valve seat surface 124 in the flow tube 121 of the choke valve 120. Further, when a difference (Pb-Pe) between the booster pressure Pb and the engine pressure Pe is equal to or less than a set value Pc when the booster pressure Pb is greater than the engine pressure Pe, the choke valve 120 may be configured to close the main flow path inlet 112 as illustrated in FIG. 12B. In contrast, the second valve body 142 of the check valve assembly 140 may be configured to move rearward against spring force of the valve spring 143 by the booster pressure Pb being exerted in the flow tube 121 of the choke valve 120, and may be configured to open the choke valve aperture 123.

Therefore, the choke flow path may include the choke valve aperture 123 and may be opened when the main flow path 110a is closed, and air flows through the interior flow path of the flow tube 121 and the choke valve aperture 123 during charging negative pressure of the booster 20, thereby exhibiting an effect of reduction of noise. Additionally, when the negative pressure in the booster 20 is insufficient at a certain level or less, for example, when the difference (Pb-Pe) between the booster pressure Pb and the engine pressure Pe is greater than the set value Pc in a state in which the booster pressure Pb is greater than the engine pressure Pe, the choke valve 120 may be configured to slide rearward in the housing 110 by the booster pressure Pb being exerted on the first valve body 122 of the choke valve 120 as illustrated in FIG. 12C. Therefore, the main flow path inlet 112 of the housing 110 may be opened.

In particular, as the choke valve 120 moves rearward, the flow tube 121 of the choke valve 120 may be configured to move rearward in the closing unit 115 of the sub-housing 114, and the choke valve aperture 123 may be positioned within the interior of the closing unit 115. For example, the choke valve aperture 123 may be configured to be closed by the closing unit 115. The second valve body 142 of the check valve assembly 140 may be moved further rearward by the booster pressure Pb being exerted in the flow tube 121 of the choke valve 120. As a result, as the main flow path inlet 112 opens as described above, air passes through the main flow path 110a of the noise reduction device 100. Accordingly, a reduction in negative pressure charging rate and a negative pressure charging speed of the brake booster 20 may be prevented.

Figure 13A:
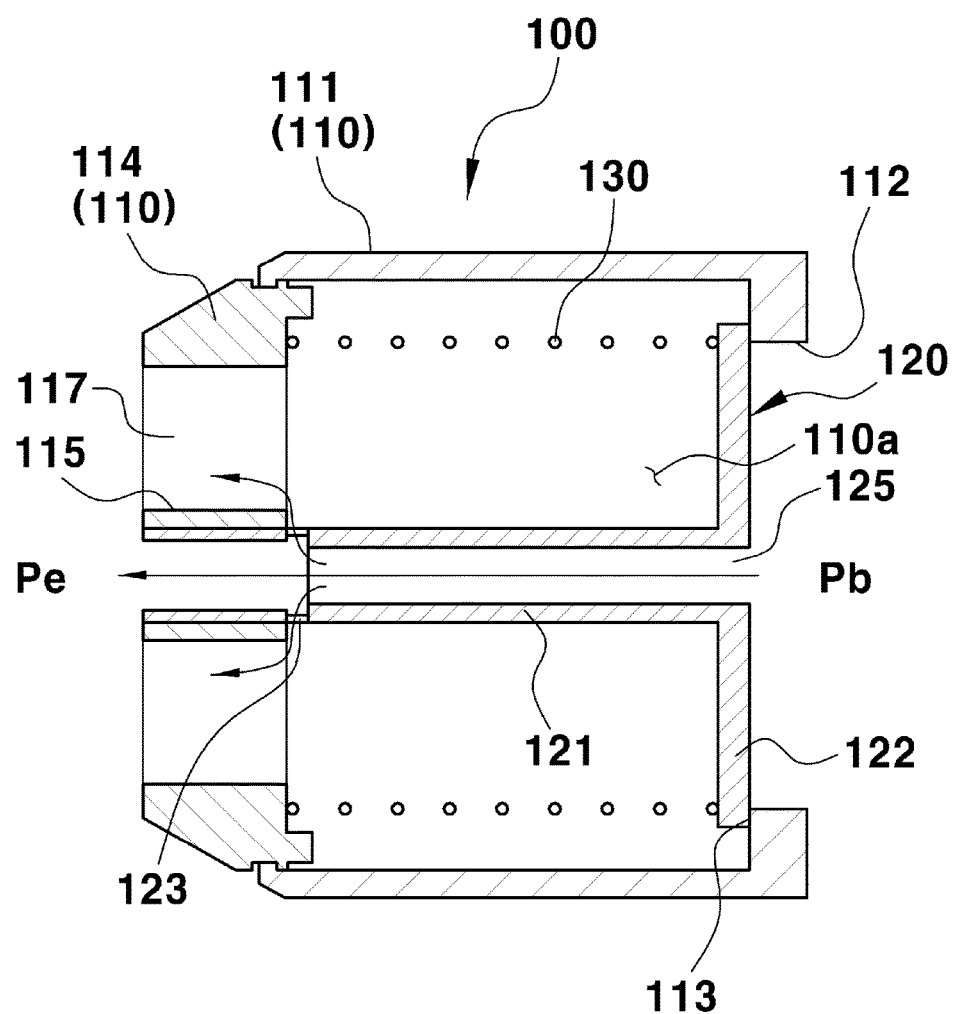
FIGS. 13A and 13B are exemplary views illustrating a state in which the noise reduction device according to the second exemplary embodiment of the present invention is operated.
Figure 13B:
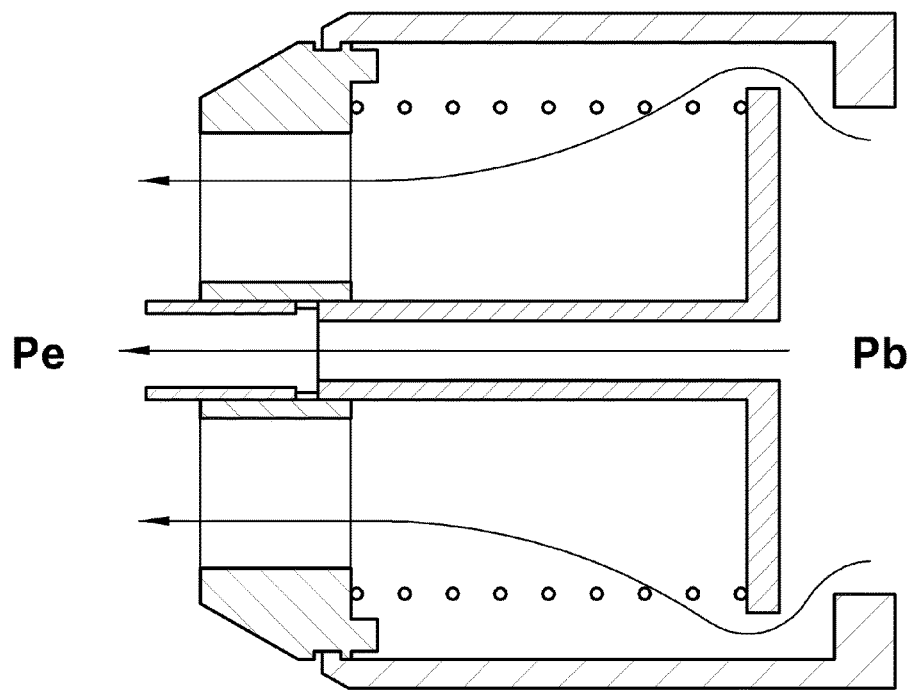

FIGS. 13A and 13B are exemplary views illustrating a state in which the noise reduction device according to the second exemplary embodiment is operated, and in a case in which the negative pressure intensifier 21 is applied as described above, the noise reduction device 100, which has no check valve assembly 140, is disposed in the vacuum hose (negative pressure line) 16c. FIG. 13A illustrates when the choke flow path is opened, and FIG. 13B illustrates when the main flow path 110a is opened.

In the noise reduction device 100 according to the second exemplary embodiment which has no check valve assembly, the noise reduction device 100 may be operated to exhibit an effect of noise reduction by using the choke flow path when the negative pressure of the booster 20 is sufficient at or below a certain level. In other words, under a reverse negative pressure condition in which the booster pressure Pb is less than the engine pressure Pe, or when the difference (Pb-Pe) between the booster pressure Pb and the engine pressure Pe is equal to or less than the set value Pc in a state in which the booster pressure Pb is greater than the engine pressure Pe, the choke valve 120 may be configured to close the main flow path inlet 112 as illustrated in FIG. 13A.

In particular, the choke valve aperture 123 formed in the flow tube 121 may be positioned external to the closing unit 115 of the sub-housing 114, and the choke valve aperture 123 may be configured to be opened. As a result, when choke flow path including the choke valve aperture 123 is opened when the main flow path 110a is closed, air may flow through the interior flow path of the flow tube 121 and the choke valve aperture 123 during charging negative pressure of the booster 20, thereby exhibiting an effect of reducing noise.

As described above, in the noise reduction device 100 according to the second exemplary embodiment of the present invention, and in the noise reduction device 100 according to the first exemplary embodiment, the choke valve aperture 123 of the flow tube 121 may be formed to be positioned at an exposed position external to the closing unit 115 when the first valve body 122 of the choke valve 120 is seated on the valve seating portion 113 to close the main flow path inlet 112 of the housing 110. In the second exemplary embodiment, the choke valve aperture 123 may be configured to be opened and closed by the closing unit 115, and as a result, the choke valve aperture 123 may be maintained opened when the choke valve 120 closes the main flow path inlet 112.

In the first exemplary embodiment, the choke valve aperture 123 may be configured to be opened and closed by the closing unit 115 (e.g., which opens and closes the choke valve aperture based on the position of the choke valve in the front and rear directions) and by the second valve body 142 of the check valve assembly 140. Accordingly, and as a result, even when the choke valve 120 closes the main flow path inlet 112, the choke valve aperture 123 may be configured to be selectively opened and closed based on the position of the second valve body 142 of the check valve assembly 140.

Furthermore, when the difference (Pb-Pe) between the booster pressure Pb and the engine pressure Pe is greater than the set value Pc when the booster pressure Pb is greater than the engine pressure Pe when the negative pressure in the booster 20 is insufficient at a certain level or less, the choke valve 120 may be configured to slide rearward in the housing 110 by the booster pressure Pb being exerted on the first valve body 122 of the choke valve 120 as illustrated in FIG. 13B. Therefore, the main flow path inlet 112 of the housing 110 may be opened. In other words, as the choke valve 120 moves rearward, the flow tube 121 of the choke valve 120 may be configured to move rearward in the closing unit 115 of the sub-housing 114, and the choke valve aperture 123 may be positioned within the interior of the closing unit 115. For example, the choke valve aperture 123 may be configured to be closed by the closing unit 115. As a result, as the main flow path inlet 112 may be opened as described above, air may be configured to pass through the main flow path 110a of the noise reduction device 100, and a negative pressure charging rate and a negative pressure charging speed of the brake booster 20 may be prevented from being reduced.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A noise reduction device for a negative pressure line of a brake booster, comprising:
   a housing having a main flow path through which air passes, a closing unit disposed in the main flow path, a main flow path inlet connected to a brake booster side via a first side of a vacuum hose, and a main flow path outlet connected to an engine side via a second side of the vacuum hose;
   a choke valve having a flow tube coupled to the closing unit and has a choke valve aperture penetratively formed at a first side of the flow tube to have an interior flow path of the flow tube to communicate with the main flow path, and a first valve body integrally formed with the flow tube and has a choke flow path inlet formed to allow the interior flow path of the flow tube to communicate with an interior of the first side of the vacuum hose; and
   a main spring which elastically supports the choke valve configured to be elastically movable forward and rearward in the housing,
   wherein the choke valve is configured to move forward and rearward based on pressure at the brake booster side exerted on a front surface of the first valve body through the main flow path inlet and pressure at the engine side exerted on a rear surface of the first valve body through the main flow path outlet and the main flow path, the first valve body is configured to open and close the main flow path inlet based on a position of the choke valve in front and rear directions, and the choke valve aperture is configured to be opened and closed via the closing unit.

2. The noise reduction device of claim 1, wherein the noise reduction device is disposed within the vacuum hose that connects the brake booster side and a surge tank of an engine.

3. The noise reduction device of claim 2, wherein the noise reduction device is fixed by press-fitting the housing into the vacuum hose that connects the brake booster side and the surge tank of the engine.

4. The noise reduction device of claim 1, wherein a valve seating portion protrudes inward along the entire circumference of the main flow path inlet of the housing, and the front surface of the first valve body of the choke valve is seated on a valve seating portion when the main flow path inlet is in a closed position.

5. The noise reduction device of claim 1, wherein the closing unit is disposed in the housing by supports, and the closing unit is formed in a cylindrical shape, with the flow tube of the choke valve inserted into the closing unit to be slidable in forward and rearward directions.

6. The noise reduction device of claim 5, wherein the choke valve aperture of the flow tube is closed by being disposed within an interior of the closing unit or opened by being exposed to an exterior of the closing unit, based on the positions of the choke valve and the flow tube in the front and rear directions.

7. The noise reduction device of claim 5, wherein the supports extend to connect an interior surface of the housing and an exterior surface of the closing unit, wherein spaces between the supports in the housing become the main flow path outlet.

8. The noise reduction device of claim 5, wherein the housing includes:
   a cylindrical main housing which has a first end portion that is opened to form the main flow path inlet; and
   a ring-shaped sub-housing coupled to a second end portion of the main housing and in which the supports and the closing unit are installed.

9. The noise reduction device of claim 1, wherein the choke valve includes:
   the flow tube with a tubular shape and the choke valve aperture is penetratively formed; and
   the first valve body has a plate shape and is integrally formed with a first end portion of the flow tube.

10. The noise reduction device of claim 2, wherein a negative pressure intensifier is disposed in the vacuum hose between the brake booster and the engine, the noise reduction device is inserted and disposed into the vacuum hose between the negative pressure intensifier and the brake booster.

11. The noise reduction device of claim 1, wherein a negative pressure intensifier is disposed in the vacuum hose between the brake booster side and the engine side, the first side of the vacuum hose is connected with the brake booster side, and the second side of the vacuum hose is connected to the engine side via the negative pressure intensifier.

12. The noise reduction device of claim 10, wherein a check valve assembly, configured to open and close the choke valve aperture based on pressure at the brake booster side which is exerted in the interior flow path of the flow tube, is disposed in the flow tube of the choke valve.

13. The noise reduction device of claim 12, wherein the check valve assembly includes:
   a fixing unit integrally coupled to the flow tube of the choke valve;
   a second valve body configured to selectively open and close the choke valve aperture while moving forward and rearward in the flow tube of the choke valve based on pressure at the brake booster side; and
   a valve spring disposed to connect the fixing unit and the second valve body and configured to elastically support the second valve body with respect to the fixing unit.

14. The noise reduction device of claim 13, wherein a valve seat surface, having a catching projection structure, is disposed in the flow tube wherein the second valve body moves forward and closes the choke valve aperture, the second valve body is seated on the valve seat surface to preclude further forward movement.

15. The noise reduction device of claim 14, wherein the valve seat surface is formed when an interior diameter of the flow tube at a portion where the first valve body is formed based on the choke valve aperture is less than an interior diameter at a portion where the check valve assembly is inserted.

* * * * *